(12) United States Patent
Belter et al.

(10) Patent No.: US 7,021,262 B1
(45) Date of Patent: Apr. 4, 2006

(54) UNDERCOWL PLENUM CHAMBER WITH PREFERENTIAL AIR PATHS

(75) Inventors: David J. Belter, Oshkosh, WI (US); Troy J. Kollmann, Fond du Lac, WI (US); Wade A. Loberger, Oshkosh, WI (US); Eric S. Mueller, Fond du Lac, WI (US); Jeffrey J. Broman, West Bend, WI (US)

(73) Assignee: Brunswick Corporation, Lake Forest, IL (US)

( * ) Notice: Subject to any disclaimer, the term of this patent is extended or adjusted under 35 U.S.C. 154(b) by 0 days.

(21) Appl. No.: 10/948,388

(22) Filed: Sep. 23, 2004

(51) Int. Cl.
*F02M 35/10* (2006.01)

(52) U.S. Cl. .............................. 123/184.47; 123/198 E; 123/184.49; 123/184.42; 440/77; 440/88 A

(58) Field of Classification Search ........... 123/184.47, 123/184.49, 184.24, 184.26, 184.34, 184.36, 123/184.42, 184.44, 198 E; 440/77, 88 A
See application file for complete search history.

(56) References Cited

U.S. PATENT DOCUMENTS

| | | | |
|---|---|---|---|
| 4,860,703 A | 8/1989 | Boda et al. | 123/195 P |
| 5,119,778 A | 6/1992 | Corbett | 123/216 |
| 5,357,913 A * | 10/1994 | Okumura et al. | 123/184.34 |
| 5,573,436 A | 11/1996 | Trudeau et al. | 440/77 |
| 5,829,402 A * | 11/1998 | Takahashi et al. | 123/184.24 |
| 5,873,755 A | 2/1999 | Takahashi et al. | 440/77 |
| 5,996,546 A | 12/1999 | Kollmann et al. | 123/195 C |
| 6,210,243 B1 * | 4/2001 | Nakase | 440/88 R |
| 6,302,749 B1 | 10/2001 | Tawa et al. | 440/76 |
| 6,358,105 B1 | 3/2002 | Isogawa et al. | 440/77 |
| 6,383,044 B1 | 5/2002 | Nemoto et al. | 440/77 |
| 6,413,131 B1 | 7/2002 | Phillips et al. | 440/88 |
| 6,532,914 B1 * | 3/2003 | Washizu | 123/41.41 |
| 6,645,022 B1 | 11/2003 | Tsubouchi et al. | 440/77 |
| 6,752,114 B1 * | 6/2004 | Ochiai et al. | 123/184.21 |
| 6,912,996 B1 * | 7/2005 | Kato | 123/469 |

* cited by examiner

*Primary Examiner*—Tony M. Argenbright
*Assistant Examiner*—Johnny H. Hoang
(74) *Attorney, Agent, or Firm*—William D. Lanyi

(57) ABSTRACT

An air intake system for an outboard motor provides parallel air flow paths between an opening formed in a cowl of the outboard motor and an air intake manifold of an engine under the cowl. A first air path flows in a relatively direct path between the opening in the cowl and the first inlet of a plenum chamber. A second air flow flows in a less direct path from the opening in the cowl to a second inlet of the plenum chamber. The second air flow is used to remove heat from a preselected component, such as an alternator, before it rejoins the first air flow within the cavity of the plenum chamber and is directed, in combination with the first air flow, through an intake air conduit connected to an outlet of the plenum chamber and to an air intake manifold of the engine.

20 Claims, 6 Drawing Sheets

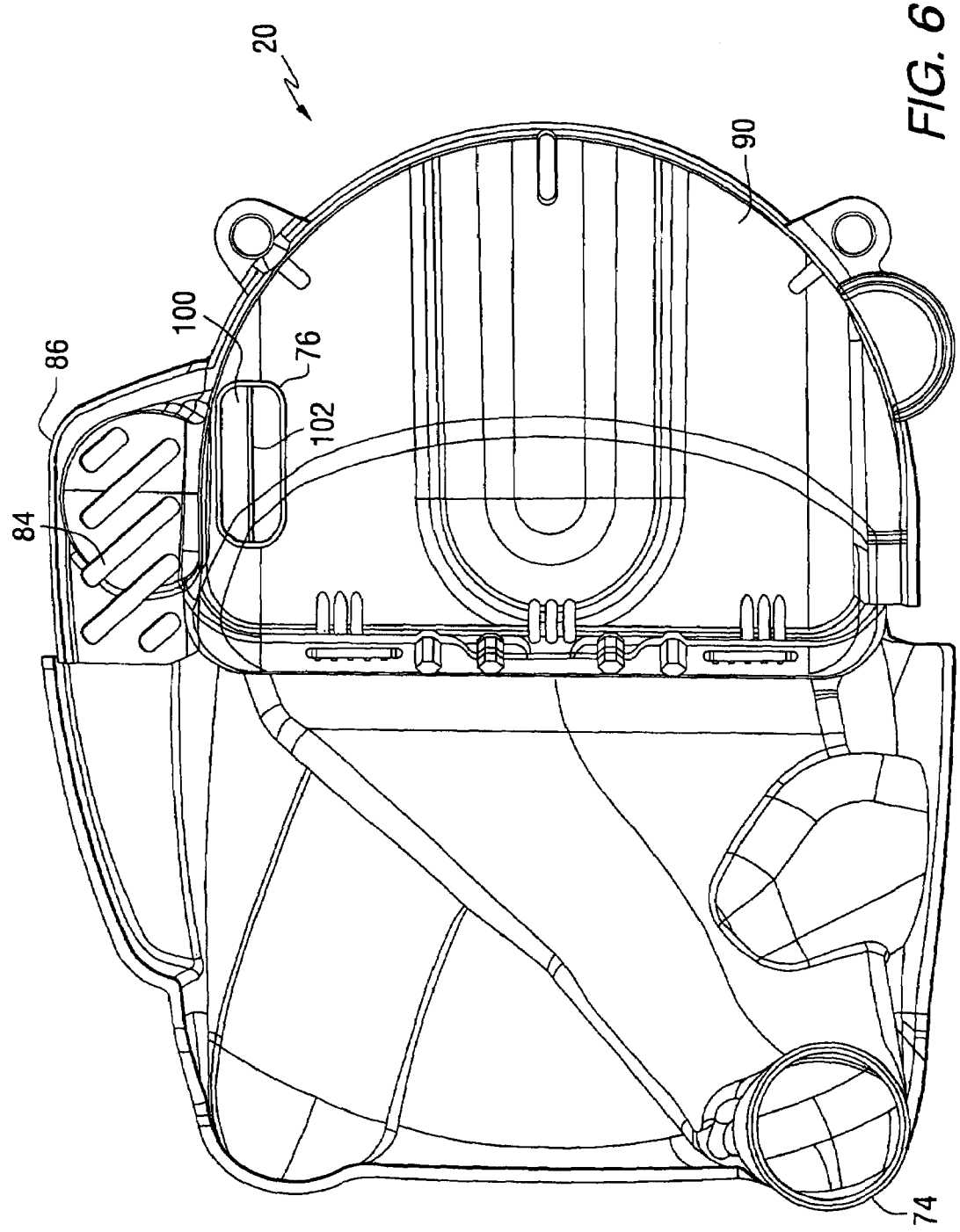

UNDERCOWL PLENUM CHAMBER WITH PREFERENTIAL AIR PATHS

BACKGROUND OF THE INVENTION

1. Field of the Invention

The present invention is generally related to an outboard motor with an undercowl plenum chamber that directs air along two parallel paths prior to combining the two paths together to supply air to an air intake manifold of an engine.

2. Description of the Prior Art

Many different cowl and undercowl structures are known to those skilled in the art for receiving air through an opening in a cowl and directing that air to various regions within the cavity of the cowl.

U.S. Pat. No. 4,860,703, which issued to Boda et al. on Aug. 29, 1989, discloses a cowl assembly with water resistant air intake duct and sealing. An outboard marine motor housed by a cowl assembly has an upper cowl section and a lower cowl section and includes various features for improving the structural integrity of the cowl assembly and for providing a water resistant seal at the joint between the cowl sections and at various points of entry of cables and other mechanical devices. An improved air intake duct prevents the entry of water into the interior cavity of the cowl assembly.

U.S. Pat. No. 5,119,778, which issued to Corbett on Jun. 9, 1992, discloses a tuned intake air system for a rotary engine. The system is intended for use in an outboard motor and includes a plenum chamber mounted on the rear of the engine directly against the exhaust manifold, which plenum chamber receives cooling air discharged from the engine. Air from the plenum chamber is directed into an elongated outlet conduit having an extended tuned length to provide an optimum pulsed air flow to the combustion air inlet of the engine.

U.S. Pat. No. 5,573,436, which issued to Trudeau et al. on Nov. 12, 1996, describes a semi-submersible outboard motor cover with air passage. A particular embodiment of the cover is formed by a generally hollow shell having an open side. An air passage is located opposite the opened side at an upper portion of the shell. A baffle extends from an upper inner portion of the shell to an elevation below the air passage and is disposed generally opposite the air passage.

U.S. Pat. No. 5,873,755, which issued to Takahashi et al. on Feb. 23, 1999, describes a cowling for an outboard motor. The cowling has at least one intake vent positioned therein and includes an engine cover which defines an isolated intake air path from the vent across a top end of the engine to an engine air intake. The cover also defines a chamber in which a flywheel rotated by the crankshaft at the top end of the engine is positioned.

U.S. Pat. No. 5,996,546 which issued to Kollmann et al. on Dec. 7, 1999, discloses an integrated flywheel cover and air conduit passages. A cover for an outboard motor is provided to protect an operator from a flywheel. The cover is disposed under the cowl of the outboard motor. The cover is made of a generally rigid material, such as plastic, with first and second sheets being associated together to form conduits with openings extending therefrom.

U.S. Pat. No. 6,302,749, which issued to Tawa et al. on Oct. 16, 2001, describes an outboard motor that has a first case member and a second case member connected to the first case member to form an enclosure having an inner space in which is mounted an engine. The first case member has an air intake hole for taking air into the inner space and a vent hole for exhausting the air after it circulates in the inner space to cool the interior of the engine.

U.S. Pat. No. 6,358,105, which issued to Isogawa et al. on Mar. 19, 2002, describes a cowling arrangement for an outboard motor. The arrangement includes a flywheel cover and cowling that incorporates upwardly and downwardly extending ribs which are positioned along an air path between the air vent of the outboard motor and the throttle body of the motor. These ribs act as labyrinth-type seals which prevent water entering the air vent from contacting the throttle body.

U.S. Pat. No. 6,383,044, which issued to Nemoto et al. on May 7, 2002, describes an outboard motor that has a first passage for supplying air from above the generator and a second passage for supplying air from below the generator, so as to cool the generator.

U.S. Pat. No. 6,413,131, which issued to Phillips et al. on Jul. 2, 2002, discloses an air flow system for an outboard motor. The outboard motor is provided with an air duct located within the cavity of a cowl of an outboard motor. The air duct defines a chamber within it in association with first and second openings that allow heated air to flow, through the creation of convection currents, out of the engine compartment under a cowl. This convection flow removes heat from the fuel system components and reduces the likelihood that vapor lock will occur subsequent to the use of an internal combustion engine that is followed by turning the engine off.

U.S. Pat. No. 6,645,022, which issued to Tsubouchi et al. on Nov. 11, 2003, describes an outboard motor which comprises an engine cover having an air intake opening for taking in air, an engine disposed in the engine cover, and an AC generator disposed in the engine cover for generating electricity to drive the engine. A cooling air guide member is disposed in the engine cover for guiding the air taken in by the air intake opening towards the AC generator. The cooling air guide member has a bottom wall, a pair of side walls extending upwardly from opposite side edges of the bottom wall, and an opening extending through the bottom wall so that the air taken in by the intake opening is guided by the side walls and the bottom wall to flow through the opening to cool the AC generator.

The patents described above are hereby expressly incorporated by reference in the description of the present invention.

As described above in the prior art, it is well known to those skilled in the art that air must be appropriately directed under the cowl of the outboard motor to efficiently cool certain components. Typically, an AC generator or alternator benefits from additional cooling by this air flow under the cowl. It would therefore be significantly beneficial if a simple and efficient way could be provided to direct air, which flows into the cowl, to an air intake manifold of an engine while also providing a cooling air flow in thermal communication with the generator or alternator. It would also be beneficial if this cooling system could be provided in a simple and efficient way with a minimum of additional components required.

SUMMARY OF THE INVENTION

An air intake system for an outboard motor, made in accordance with a preferred embodiment of the present invention, comprises a cowl having an opening formed therethrough and an engine disposed under the cowl. The engine has an air intake manifold. A component is associated with the engine and disposed under the cowl. In a particularly preferred embodiment of the present invention, the component is an alternator or generator. A plenum chamber is disposed under the cowl. The plenum chamber has a first inlet, a second inlet, and an outlet. The first and second inlets of the plenum chamber define first and second air paths between the opening of the cowl and an internal cavity of the plenum chamber. The first air path extends directly between the opening of the cowl and the first inlet of the plenum chamber. It further extends into the internal cavity of the plenum chamber. The second air path extends from the opening of the cowl to the second inlet of the plenum chamber and flows in thermal communication with the component, such as the alternator, of the outboard motor. An air intake conduit is connected in fluid communication with the outlet of the plenum chamber. The intake air conduit is connected in fluid communication with the air intake manifold of the engine.

In a particularly preferred embodiment of the present invention, a compressor is connected in fluid communication with the intake air conduit and the first inlet of the plenum chamber comprises two passages formed through the wall of the plenum chamber. A flow directing baffle extends from the plenum chamber and is configured to direct the second air path toward the component, such as the alternator or generator. The flow directing baffle comprises a plurality of slots formed therein in a preferred embodiment of the present invention. At least a portion of the second air path is directed to flow through the plurality of slots in a preferred embodiment of the present invention.

The first inlet of the plenum chamber is spaced apart from the opening of the cowl by a first distance and the second inlet of the plenum chamber is spaced apart from the opening of the cowl by a second distance. The second distance is greater in magnitude than the first distance in a preferred embodiment of the present invention. One embodiment of the present invention can further comprise a valve disposed in fluid communication with the second inlet of the plenum chamber. The valve is operable to regulate an amount of air entering the second inlet along the second air path.

In certain embodiments of the present invention, it can further comprise a tubular structure formed around the opening of the cowl. The tubular structure has a central axis which is generally vertical. The present invention can further comprise a cover attached to the cowl and disposed above the opening of the cowl. The cover forms a space between the cover and a surface of the cowl through which the opening is formed.

BRIEF DESCRIPTION OF THE DRAWINGS

The present invention will be more fully and completely understood from a reading of the description of the preferred embodiment in conjunction with the drawings, in which:

FIG. 6 is an underside view of the plenum chamber showing a valve associated with the second inlet of the plenum chamber.

DESCRIPTION OF THE PREFERRED EMBODIMENT

Figure 1:
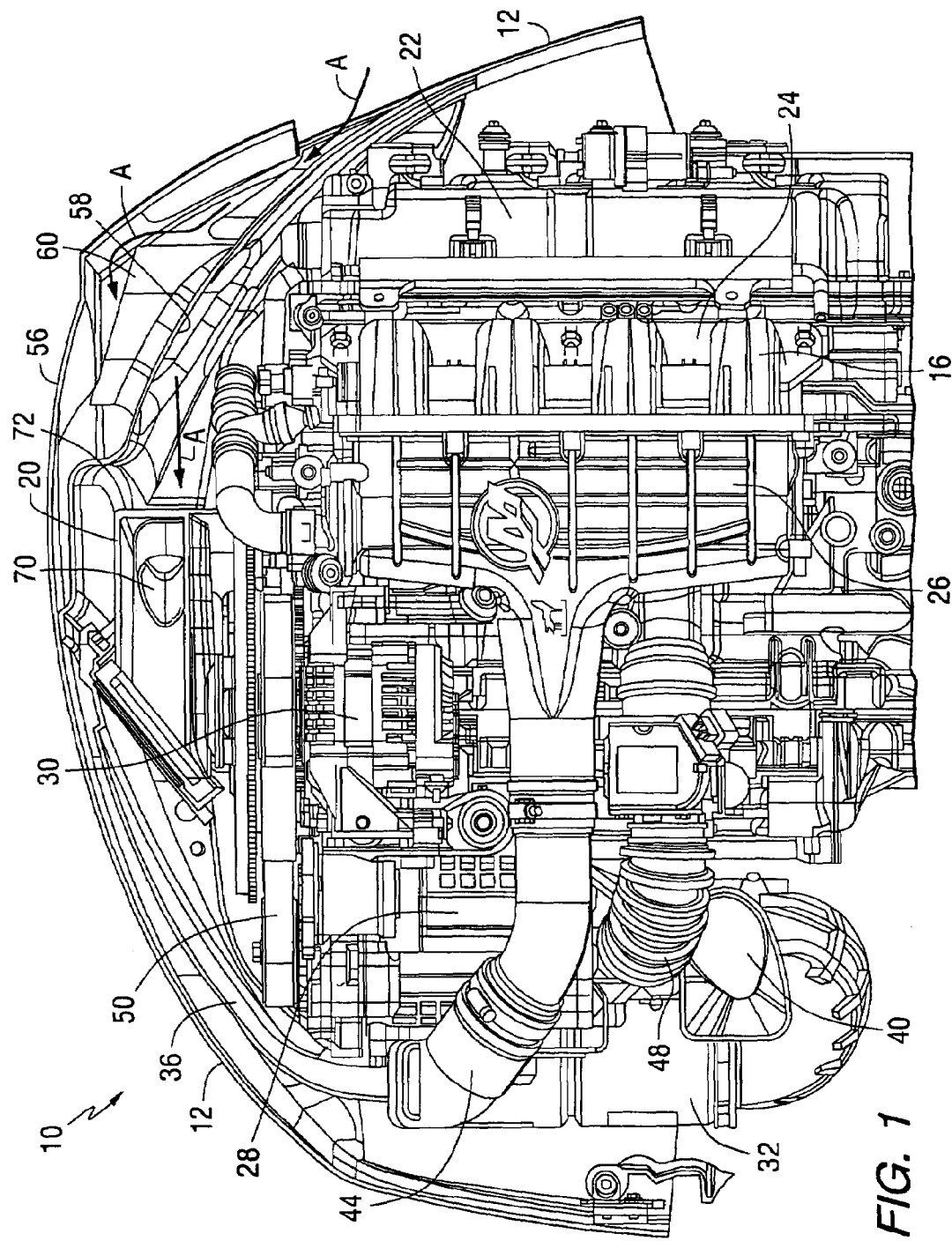
FIG. 1 is a side view of an engine of an outboard motor with a portion of the cowl removed.

Throughout the description of the preferred embodiment of the present invention, like components will be identified by like reference numerals.

FIG. 1 shows a side view of an outboard motor with the cowl 12 sectioned to expose the engine 16 and the present invention 20.

In FIG. 1, the engine 16 is shown with its cam cover 22, its air intake manifold 24, a charge air cooler 26, a supercharger 28, which can be a screw compressor, an alternator 30, a resonator 32 which is provided to reduce the sound level emanating from the outboard motor, an air intake conduit 36, and an electronic throttle control device 40.

With continued reference to FIG. 1, reference numeral 44 identifies the outlet port of the screw compressor supercharger 28 and reference numeral 48 identifies a bypass conduit associated with the supercharger 28. The alternator 30 is provided with a belt 50 through which the engine provides motive force for the alternator 30. The cowl 12 is provided with a cover 56. Under the cover 56, an opening 58 is formed through a portion of the cowl 12. A tubular structure 60 provides a device which inhibits water from flowing into and through the opening 58 formed in the cowl 12.

In operation, air (represented by arrow A in FIG. 1) flows into a space between a surface of the cowl 12 and the cover 56. It then flows to an upper portion of the tubular structure 60 and then downward through the opening 58. The continued movement of the air A under the cowl 12 will be described in greater detail below in conjunction with the figure that shows the present invention 20 in greater detail.

Figure 2:
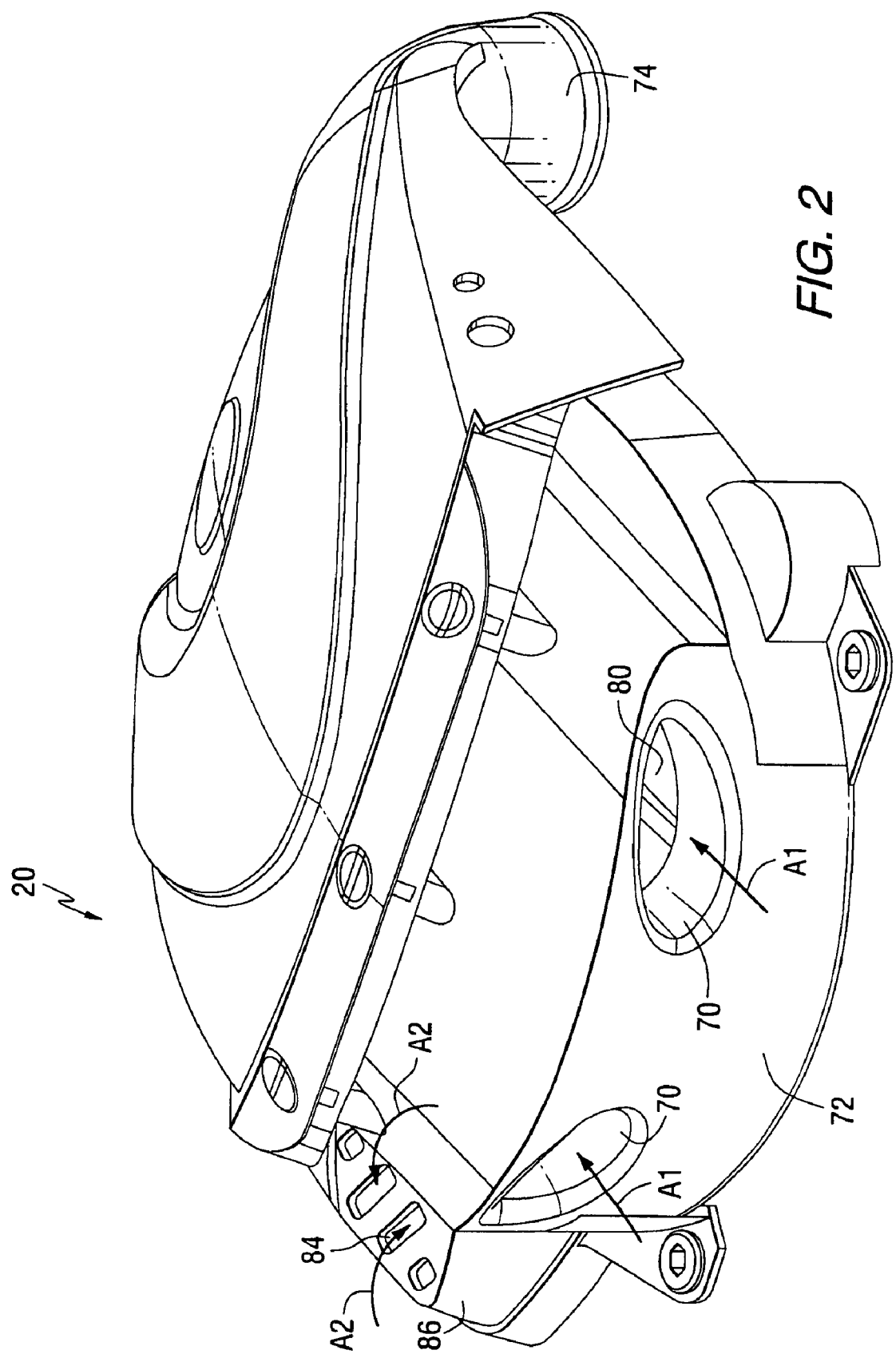
FIGS. 2 and 3 are two isometric views of a plenum chamber of the present invention.
Figure 3:
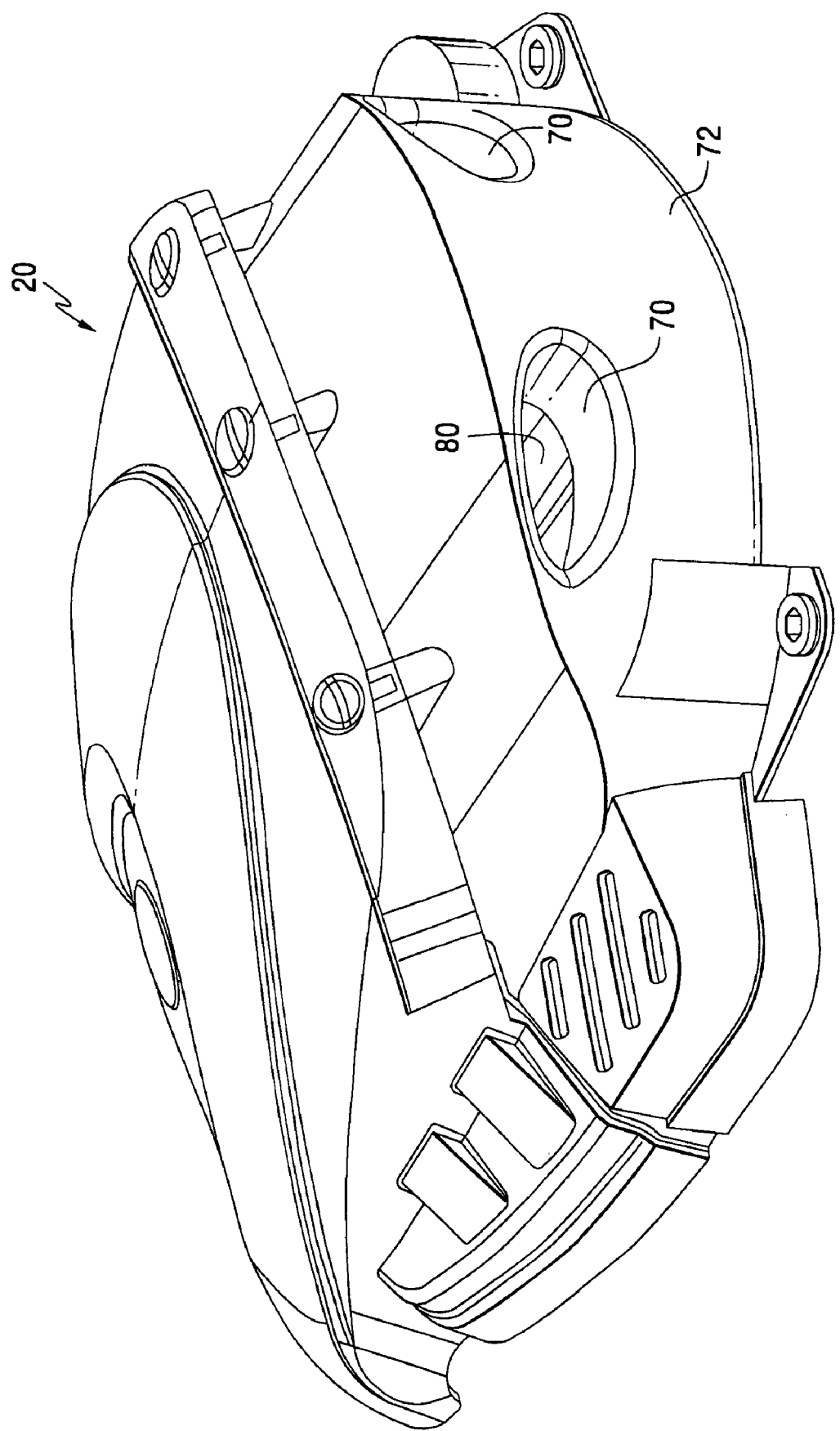

FIGS. 2 and 3 illustrate two isometric views of the plenum chamber 20 of the present invention. With reference to FIGS. 1–3, the plenum chamber 20 is disposed under the cowl 12. The plenum chamber 20 has a first inlet 70 which is represented in FIGS. 2 and 3 as two passages formed through a wall 72 of the plenum chamber 20. The plenum chamber also has a second inlet 76 which will be described below in conjunction with FIG. 4.

The plenum chamber 20 has an outlet 74. The first and second inlets, 70 and 76, of the plenum chamber 20 define first and second air paths between the opening 58 of the cowl 12 and an internal cavity 80 within the plenum chamber 20. The first air path is represented by arrows A1. It extends directly between the opening 58 of the cowl 12 and the first inlet 70 of the plenum chamber 20.

Figure 4:
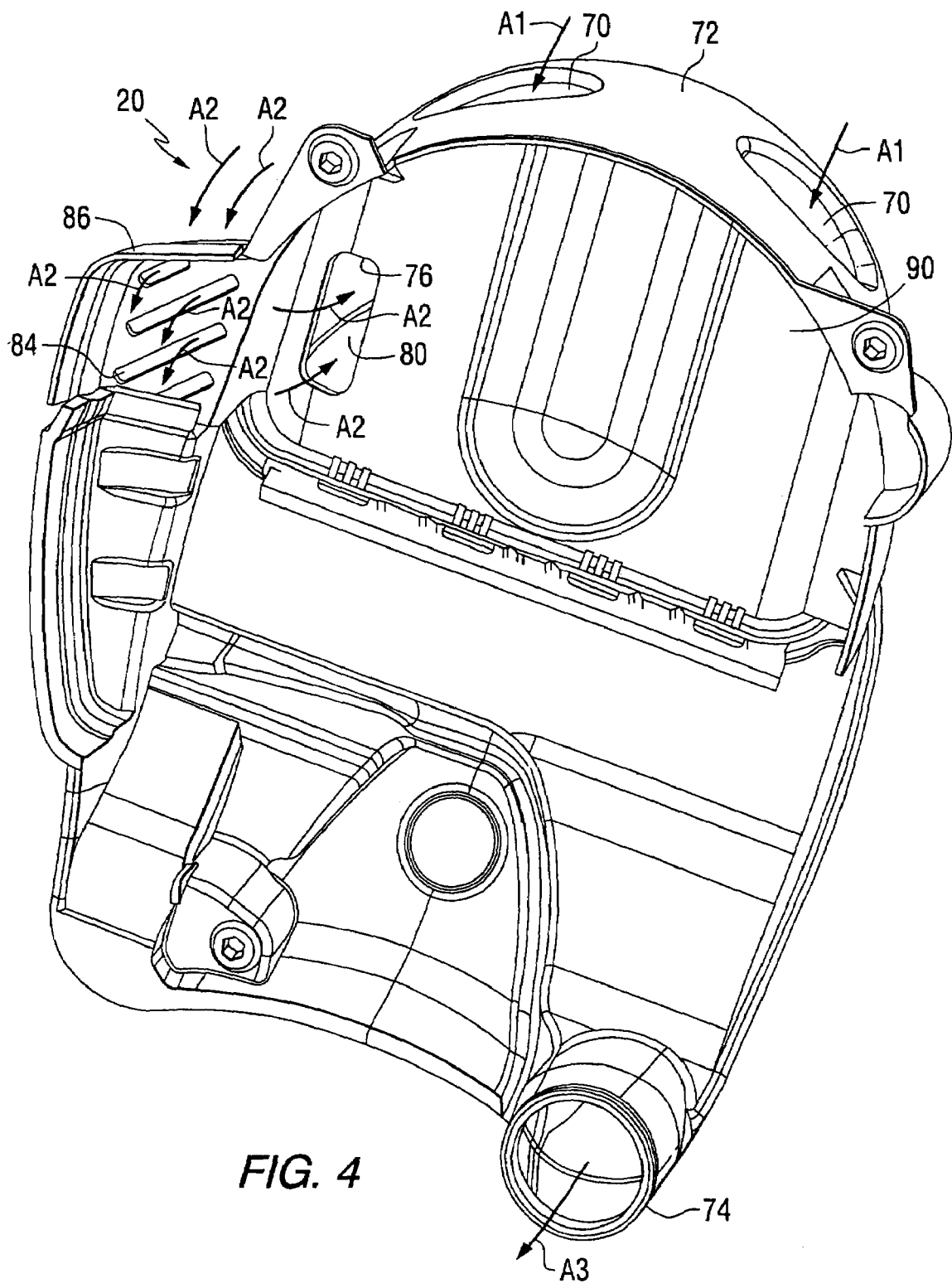
FIG. 4 is an isometric view of the underside of the plenum chamber of the present invention.

The second air path, represented by arrows A2 in FIG. 4, flows from the opening 58 of the cowl 12 toward the slots 84 formed in a flow directing baffle 86 which extends from the structure of the plenum chamber 20 and is configured to direct the second air path A2 toward the component, which can be an alternator associated with the engine 16.

FIG. 4 is a view of the plenum chamber 20 which illustrates the underside of the plenum chamber which is not clearly visible in FIGS. 2 and 3. The second inlet 76 is shown in FIG. 4 and comprises a hole through an under surface 90 of the plenum chamber 20 which allows the second air flow A2 to enter the internal cavity 80 within the plenum chamber 20. Between the slots 84 and the second inlet 76, the second air flow A2 is able to flow in thermal communication with the alternator 30 that is shown in FIG. 1 below the plenum chamber 20. Also shown in FIG. 4 is the baffle 86, the first inlet 70 formed in the surface 72 of the plenum chamber 20 and the outlet 74. Within the internal cavity of the plenum chamber 20, the first air flow A1 and second air flow A2 are combined and flow outwardly, together, through the outlet 74. This combined flow is identified by arrow A3 in FIG. 4.

Figure 5:
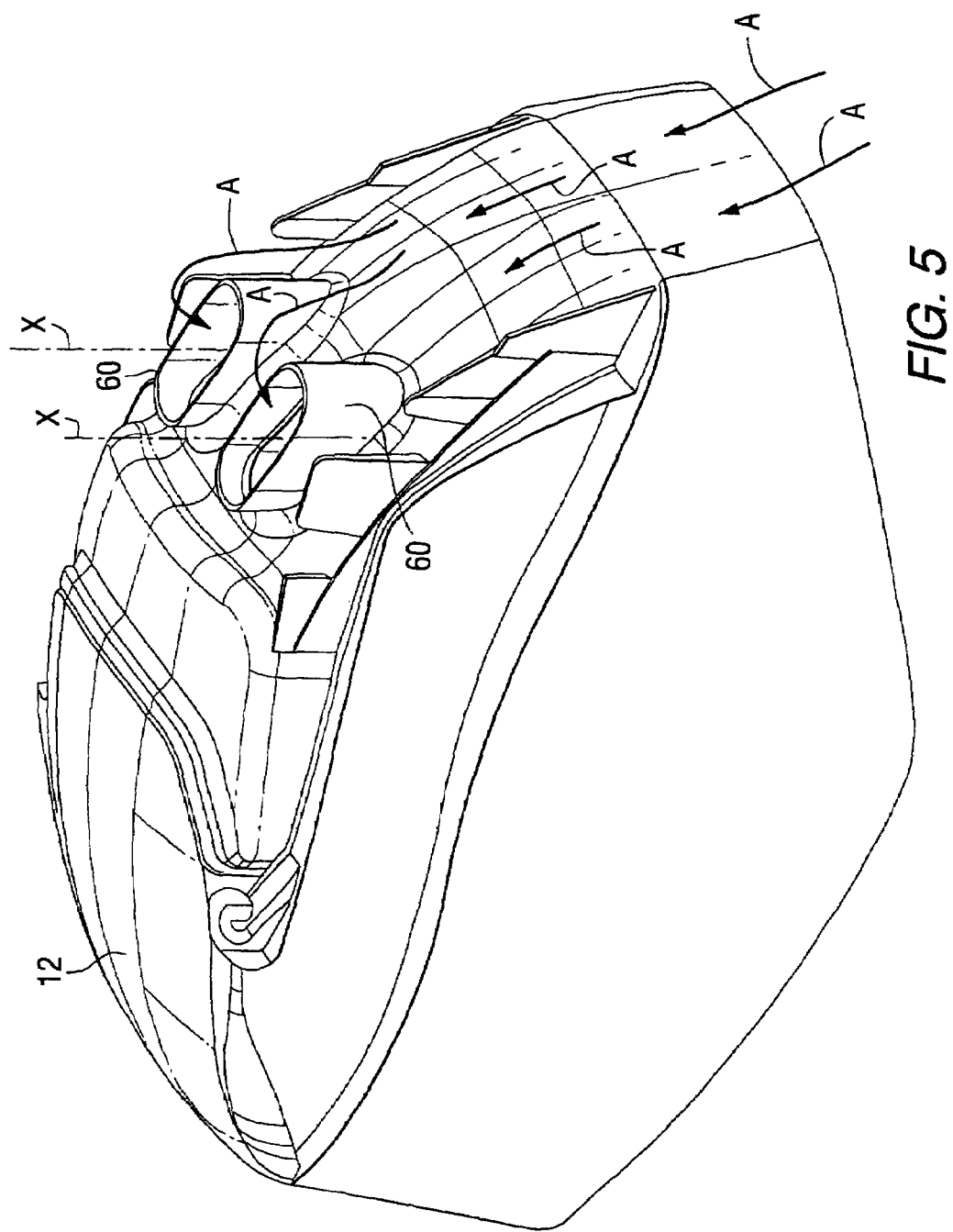
FIG. 5 is a view of the cowl of an outboard motor with a cover portion removed.

FIG. 5 shows the cowl 12 with the cover 56 removed. Removal of the cover 56 exposes the tubular structure 60 that, in a preferred embodiment of the present invention, is formed around the opening 58 of the cowl 12. Two central axes, identified by reference numeral X are shown in FIG. 5 to illustrate the central axes of the two tubular structures 60. These central axes are generally vertical. Arrows A show the flow of air as it passes from the ambient surroundings of the outboard motor and into the opening 58 through the cowl 12. Although two openings and two tubular structures 60 are shown in FIG. 5, it should be understood that a single opening is also within the scope of the present invention. In addition, a greater plurality of openings and tubular structures is also within the scope of the present invention. The air A flows through the space defined under the cover 56, as described above in conjunction with FIG. 1, and into the region under the cowl 12. This main air flow A then divides into a primary, or first, air flow A1 and a secondary, or second, air flow A2 as described above in conjunction with FIGS. 2–4.

With reference to FIGS. 1–5, it should be understood that the relative sizes of the first inlet 70 and the second inlet 76, along with the position of the flow directing baffle 86, contribute to the determination of the percentage of the total air flow A that moves along the first and second air paths, A1 and A2. These relative sizes are empirically determined for the particular engine 16 and component 30, such as an alternator, and the relative temperatures that are desired for the various components that are cooled by the second air flow A2.

The present invention distributes a portion of the total air flow directly to the intake manifold of the engine and, as a result, provides the engine with air at a lower temperature than would be possible if all of the air was first allowed to circulate under the cowl and in thermal communication with the various components of the outboard motor. While some of the air is directed in thermal communication with selected components, such as the alternator or generator, and then directed back into the flow of air toward the intake manifold of the engine, that secondary flow is less than would otherwise occur if all of the air coming into the cowl was allowed to circulate in thermal communication with the components that generate heat. An internal combustion engine benefits from intake air flow that is as cool as possible. As a result, the present invention provides adequate cooling to those components which require it, but segregates a significant and important portion of the total air flow into a direct path toward the engine without significant thermal contact with heat generating components. Most of the components located under the cowl of an outboard motor can operate efficiently and properly without the need to be cooled by the flow of incoming air. The present invention provides only the amount of cooling air to those components that is necessary.

From the above discussion in conjunction with FIGS. 1–5, it can be seen that the primary, or first, air flow A1 is intended to pass directly from the ambient surroundings of the outboard motor to the outlet 74 of the plenum chamber 20. This air then flows directly through the intake air conduit 36 through other components of the air charge system, such as the supercharger, the charge air cooler, and the air intake manifold of the engine 16. The second air flow A2 is intended to be directed initially away from the first inlet 70 so that it can flow in thermal communication with the alternator 30 or any other component which requires additional cooling. After this cooling occurs, as a result of the thermal communication between the second air flow A2 and the component, that second air flow A2 is directed back toward the plenum chamber 20 and through the second inlet 76 to join the first air flow A1 in the plenum chamber as they are combined and directed through the outlet 74 to the intake air conduit 36.

FIG. 6 illustrates an underside view of the plenum chamber 20 to illustrate an alternative embodiment of the present invention in which a valve 100 is disposed within the second inlet 76. This valve 100 can comprise a rotatable plate, such as a butterfly valve, that is able to pivot about an axis 102. The butterfly plate of the valve 100 can be rotated about the axis 102 by an electric motor or a solenoid driven actuator that is controlled by an engine control module. As an example, if the temperature of the component, such as the alternator 30, is below an upper threshold of desirable temperature, the butterfly valve 100 can be rotated to close the second inlet 76. This will have the effect of causing virtually all of the air A to flow along the first air path A1 through the first inlet 70. In essence, the valve 100 can be used to close the second inlet 76. Alternatively, the valve 100 can be partially rotated to adjust the magnitude of the second air flow A2 through the second inlet 76 and thus modulate the cooling effect of the second air flow on the component, such as the alternator 30. Although the motor or solenoid actuator is not illustrated in FIG. 6, it should be understood that these components would typically be enclosed within the plenum chamber 20 above the bottom surface 90. The actuator would be connected to a shaft that extends coaxially with the pivot axis 102 to control the rotational movement of the butterfly valve 100.

As described above, an air intake system for an outboard motor made in accordance with a preferred embodiment of the present invention comprises a cowl 12 which has an opening 58 formed therethrough. An engine 16 is disposed under the cowl 12 and the engine 16 is provided with an air intake manifold 24. A component 30, such as an alternator, is associated with the engine 16 and disposed under the cowl 12. A plenum chamber 20 is disposed under the cowl 12 and has a first inlet 70, a second inlet 76, and an outlet 74. The first and second inlets, 70 and 76, of the plenum chamber 20 define first and second air paths, A1 and A2, between the opening 58 of the cowl 12 and an internal cavity 80 of the plenum chamber 20. The first air path A1 extends directly from the opening 58 of the cowl to the first inlet 70 and then into the internal cavity 80 of the plenum chamber 20. The second air path A2 extends from the opening 58 of the cowl to the second inlet 76 of the plenum chamber and flows in thermal communication with the component 30, such as an alternator. An intake air conduit 36 is connected in fluid communication with the outlet 74 of the plenum chamber 20 and is connected in fluid communication with the air intake manifold 24 of the engine 16.

A compressor 28 can be connected in fluid communication with the intake air conduit 36. The first inlet 70 of the plenum chamber 20 can comprise two passages formed through a wall 72 of the plenum chamber 20. A flow directing baffle 86 can extend from the plenum chamber 20 and be configured to direct the second air path A2 toward the component 30. The flow directing baffle 86 can comprise a plurality of slots 84 formed therein. At least a portion of the second air flow A2 is directed to flow through the plurality of slots 84. Some of the second air flow A2 can flow around the flow directing baffle 86 and into the second inlet 76 because, in a preferred embodiment of the present invention, the flow directing baffle 86 is not completely enclosed to restrict the second air flow A2 to flow through the plurality of slots 84.

The first inlet 70 of the plenum chamber 20 is spaced apart from the opening 58 of the cowl by a first distance. This first distance can best be seen in FIG. 1 which is a direct horizontal flow from the opening 58 in the cowl 12 to the first inlet of the plenum chamber 20. The second inlet 76 of the plenum chamber 20 is spaced apart from the opening 58 of the cowl 12 by a second distance. This second distance can be seen in FIG. 1 to be greater in magnitude than the more direct first distance between the opening 58 in the cowl 12 and the first inlet of the plenum chamber 20. This difference in magnitude between the first and second distances urges a majority of the air flow to pass directly into the first inlet 70 with a lesser magnitude of air flow passing along the second air flow A2 to the second inlet 76.

A valve 100 can be disposed in fluid communication with the second inlet 76 and can be operable to regulate an amount of air entering the second inlet 76 along the second air path A2.

A tubular structure 60, in a preferred embodiment of the present invention, is formed around the opening 58 of the cowl 12 and has a central axis X which is generally vertical. A cover 56 is attached to the cowl 12 and disposed above the opening 58 of the cowl 12. The cover 56 forms a space between the cover 56 and a surface of the cowl 12 through which the opening 58 is formed.

Although the present invention has been described with particular specificity and illustrated to show a preferred embodiment, it should be understood that alternative embodiments are also within its scope.

What is claimed is:

1. An air intake system for an outboard motor, comprising:
    a cowl having an opening formed therethrough;
    an engine disposed under said cowl, said engine having an air intake manifold;
    a component associated with said engine and disposed under said cowl;
    a plenum chamber disposed under said cowl, said plenum chamber having a first inlet, a second inlet and an outlet, said first and second inlets of said plenum chamber defining first and second air paths between said opening and an internal cavity of said plenum chamber, said first air path extending directly from said opening to said first inlet and into said internal cavity of said plenum chamber, said second air path extending from said opening to said second inlet and flowing in thermal communication with said component of said outboard motor; and
    an intake air conduit connected in fluid communication with said outlet of said plenum chamber, said intake air conduit being connected in fluid communication with said air intake manifold.

2. The air intake system of claim 1, further comprising:
a compressor connected in fluid communication with said intake air conduit.

3. The air intake system of claim 1, wherein:
said first inlet of said plenum chamber comprises two passages formed through a wall of said plenum chamber.

4. The air intake system of claim 1, further comprising:
a flow directing baffle extending from said plenum chamber and configured to direct said second air path toward said component.

5. The air intake system of claim 1, wherein:
said flow directing baffle comprises a plurality of slots formed therein, at least a portion of said second air path being directed to flow through said plurality of slots.

6. The air intake system of claim 1, wherein:
said first inlet of said plenum chamber is spaced apart from said opening of said cowl by a first distance; and
said second inlet of said plenum chamber is spaced apart from said opening of said cowl by a second distance, said second distance is greater in magnitude than said first distance.

7. The air intake system of claim 1, further comprising:
a valve disposed in fluid communication with said second inlet, said valve being operable to regulate an amount of air entering said second inlet along said second air path.

8. The air intake system of claim 1, further comprising:
a tubular structure formed around said opening of said cowl, said tubular structure having a central axis which is generally vertical.

9. The air intake system of claim 1, further comprising:
a cover attached to said cowl and disposed above said opening of said cowl, said cover forming a space between said cover and a surface of said cowl through which said opening is formed.

10. The air intake system of claim 1, wherein:
said component is an alternator.

11. An air intake system for an outboard motor, comprising:
    a cowl having an opening formed therethrough;
    a cover attached to said cowl and spaced apart from said opening of said cowl, said cover defining an air flow passage between said cover and a surface of said cowl through which said opening is formed;
    an engine disposed under said cowl;
    a component associated with said engine and disposed under said cowl;
    a plenum chamber disposed under said cowl, said plenum chamber having a first inlet, a second inlet and an outlet, said first and second inlets of said plenum chamber defining first and second air paths between said opening and an internal cavity of said plenum chamber, said first air path extending directly from said opening to said first inlet and into said internal cavity of said plenum chamber, said second air path extending from said opening to said second inlet and flowing in thermal communication with said component of said outboard motor, said first and second air paths being parallel with each other; and
    an intake air conduit connected in fluid communication with said outlet of said plenum chamber, said intake air conduit being connected in fluid communication with said engine, said first and second air paths being combined within said plenum chamber.

12. The air intake system of claim 11, wherein:
said first inlet of said plenum chamber is spaced apart from said opening of said cowl by a first distance; and
said second inlet of said plenum chamber is spaced apart from said opening of said cowl by a second distance, said second distance is greater in magnitude than said first distance.

13. The air intake system of claim 12, further comprising:
a valve disposed in fluid communication with said second inlet, said valve being operable to regulate an amount of air entering said second inlet along said second air path.

14. The air intake system of claim 13, further comprising:

a compressor connected in fluid communication with said intake air conduit.

15. The air intake system of claim 11, further comprising:

a tubular structure formed around said opening of said cowl, said tubular structure having a central axis which is generally vertical.

16. The air intake system of claim 11, wherein:

said first inlet of said plenum chamber comprises two passages formed through a wall of said plenum chamber.

17. The air intake system of claim 11, further comprising:

a flow directing baffle extending from said plenum chamber and configured to direct said second air path toward said component.

18. The air intake system of claim 11, wherein:

said flow directing baffle comprises a plurality of slots formed therein, at least a portion of said second air path being directed to flow through said plurality of slots.

19. An air intake system for an outboard motor, comprising:

a cowl having an opening formed therethrough;

a cover attached to said cowl and disposed above said opening of said cowl, said cover forming a space between said cover and a surface of said cowl through which said opening is formed an engine disposed under said cowl, said engine having an air intake manifold;

a component associated with said engine and disposed under said cowl;

a plenum chamber disposed under said cowl, said plenum chamber having a first inlet, a second inlet and an outlet, said first and second inlets of said plenum chamber defining first and second air paths between said opening and an internal cavity of said plenum chamber, said first air path extending directly from said opening to said first inlet and into said internal cavity of said plenum chamber, said second air path extending from said opening to said second inlet and flowing in thermal communication with said component of said outboard motor, said first inlet of said plenum chamber is spaced apart from said opening of said cowl by a first distance, said second inlet of said plenum chamber is spaced apart from said opening of said cowl by a second distance, said second distance is greater in magnitude than said first distance; and an intake air conduit connected in fluid communication with said outlet of said plenum chamber, said intake air conduit being connected in fluid communication with said air intake manifold.

20. The air intake system of claim 19, further comprising:

a compressor connected in fluid communication with said intake air conduit;

a valve disposed in fluid communication with said second inlet, said valve being operable to regulate an amount of air entering said second inlet along said second air path; and a flow directing baffle extending from said plenum chamber and configured to direct said second air path toward said component, said first inlet of said plenum chamber comprises two passages formed through a wall of said plenum chamber, said flow directing baffle comprising a plurality of slots formed therein, at least a portion of said second air path being directed to flow through said plurality of slots, said component being an alternator.

* * * * *